United States Patent [19]

Yamazaki et al.

[11] Patent Number: 5,776,596
[45] Date of Patent: Jul. 7, 1998

[54] MAGNETIC RECORDING MEDIUM HAVING A MAGNETIC LAYER AND INTERMEDIATE LAYER EACH CONTAINING A SPECIFIED FATTY ACID AND FATTY ACID ESTER

[75] Inventors: Toshio Yamazaki; Shigeaki Wakana; Satoshi Nagai; Tetsutaro Inoue, all of Tochigi-ken, Japan

[73] Assignee: Kao Corporation, Tokyo, Japan

[21] Appl. No.: 754,958

[22] Filed: Nov. 22, 1996

[30] Foreign Application Priority Data

Nov. 22, 1995 [JP] Japan ................................. 7-304851
Sep. 26, 1996 [JP] Japan ................................. 8-254534

[51] Int. Cl.[6] ......................................... G11B 5/71
[52] U.S. Cl. ........................... 428/212; 428/216; 428/328; 428/336; 428/694 BP; 428/694 BS; 428/900
[58] Field of Search .......................... 428/212, 328, 428/336, 694 BP, 694 BS, 900, 216

[56] References Cited

U.S. PATENT DOCUMENTS

| | | | |
|---|---|---|---|
| 4,420,532 | 12/1983 | Yamaguchi et al. | 428/329 |
| 4,587,157 | 5/1986 | Brock et al. | 428/216 |
| 4,701,372 | 10/1987 | Akiyama et al. | 428/323 |
| 4,803,133 | 2/1989 | Hirota et al. | 428/695 |
| 4,828,925 | 5/1989 | Miyake et al. | 428/425.9 |
| 5,034,271 | 7/1991 | Miyoshi et al. | 428/323 |

FOREIGN PATENT DOCUMENTS

| | | |
|---|---|---|
| 01146124 | 6/1989 | Japan . |
| 05081646 | 4/1993 | Japan . |

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a nonmagnetic substrate, an intermediate layer provided on the nonmagnetic substrate, and a magnetic layer provided on the intermediate layer, wherein the magnetic layer contains, as a lubricant, (A) a fatty acid ester derived from a straight-chain or branched aliphatic alcohol having 3 to 7 carbon atoms and a straight-chain or branched fatty acid having 12 to 18 carbon atoms and (B) a fatty acid ester derived from a straight-chain or branched aliphatic alcohol having 8 to 14 carbon atoms and a straight-chain or branched fatty acid having 12 to 18 carbon atoms.

11 Claims, 1 Drawing Sheet

MAGNETIC RECORDING MEDIUM HAVING A MAGNETIC LAYER AND INTERMEDIATE LAYER EACH CONTAINING A SPECIFIED FATTY ACID AND FATTY ACID ESTER

BACKGROUND OF THE INVENTION

1. Field of the Invention

This invention relates to a magnetic recording medium which is excellent in electromagnetic conversion characteristics and durability and causes few dropouts.

2. Description of Related Art

Magnetic recording media have been widely used in the form of tapes, discs, drums, sheets, etc. These magnetic recording media are generally prepared by coating a nonmagnetic substrate, such as a polyester film, with a magnetic coating composition consisting mainly of magnetic powder and a binder to form a magnetic layer. In recent years, magnetic recording media have been demanded to have a reduced size and an increased recording density. To meet these demands, it has been proposed, for example, to improve the coercive force or the saturation magnetization of a magnetic layer and to reduce the thickness of a magnetic layer. In addition to the above demands, it has been demanded to develop a magnetic recording medium that can satisfy the requirement of high quality, particularly a magnetic recording medium that has excellent electromagnetic conversion characteristics and excellent durability and causes few dropouts.

SUMMARY OF THE INVENTION

Accordingly, an object of the present invention is to provide a magnetic recording medium which can realize high-density recording.

Another object of the invention is to provide a magnetic recording medium having excellent electromagnetic conversion characteristics.

A further object of the invention is to provide a magnetic recording medium which causes few dropouts.

A still further object of the invention is to provide a magnetic recording medium having excellent durability.

As a result of extensive investigations, the inventors of the present invention have found that the above objects of the invention are accomplished by incorporating a combination of specific lubricants into a magnetic layer of a magnetic recording medium.

The present invention has been completed based on this finding and provides a magnetic recording medium comprising a nonmagnetic substrate and a magnetic layer, wherein the magnetic layer contains, as a lubricant, (A) a fatty acid ester derived from a straight-chain or branched aliphatic alcohol having 3 to 7 carbon atoms and a straight-chain or branched fatty acid having 12 to 18 carbon atoms and (B) a fatty acid ester derived from a straight-chain or branched aliphatic alcohol having 8 to 14 carbon atoms and a straight-chain or branched fatty acid having 12 to 18 carbon atoms.

The magnetic recording medium according to the present invention exhibit excellent electromagnetic conversion characteristics and excellent durability and causes few dropouts owing to (A) the fatty acid ester derived from a straight-chain or branched aliphatic alcohol having 3 to 7 carbon atoms and a straight-chain or branched fatty acid having 12 to 18 carbon atoms and (B) a fatty acid ester derived from a straight-chain or branched aliphatic alcohol having 8 to 14 carbon atoms and a straight-chain or branched fatty acid having 12 to 18 carbon atoms, incorporated into the magnetic layer as the lubricant.

DETAILED DESCRIPTION OF THE INVENTION

Figure 1:
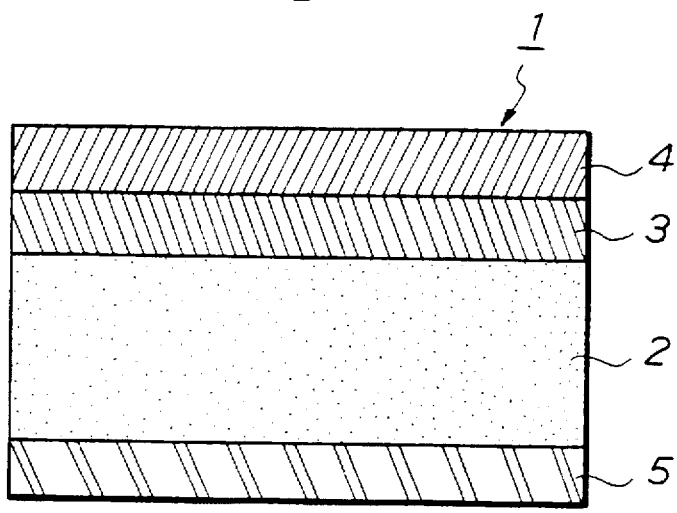
FIG. 1 is a schematic cross section illustrating a preferred embodiment of the magnetic recording medium of the present invention.
Figure 2:
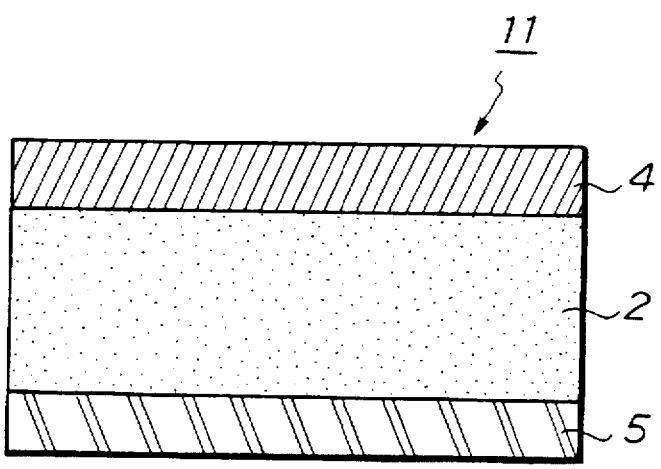
FIG. 2 is a schematic cross section illustrating another embodiment of the magnetic recording medium of the present invention.

The magnetic recording medium of the present invention will be described in detail, if necessary, by referring to the accompanying drawings. FIGS. 1 and 2 each show a schematic cross section illustrating an embodiment of the magnetic recording medium of the invention.

A magnetic recording medium 1 according to the embodiment shown in FIG. 1 is comprised of a nonmagnetic substrate 2, a magnetic layer 4, an intermediate layer 3 provided between the nonmagnetic substrate 2 and the magnetic layer 4, and a backcoating layer 5 provided on the back side of the nonmagnetic substrate 2.

A magnetic recording medium 11 according to the embodiment shown in FIG. 2 has the same layer structure as in the one shown in FIG. 1 except for having no intermediate layer 3.

The existence of the intermediate layer 3 is preferred for obtaining a smooth surface and for reproduction output. Therefore, the magnetic recording medium having the structure of FIG. 1 is preferred to the one having the structure of FIG. 2.

The nonmagnetic substrate 2 for use in the magnetic recording media 1 and 11 of the invention can be selected from those commonly known with no particular restriction. Examples of useful nonmagnetic substrates include flexible films or discs made of polymers; and films, discs or cards made of nonmagnetic metals, e.g., Cu, Al or Zn, glass, or ceramics, e.g., porcelain or earthenware.

The polymers providing flexible films or discs include polyesters, such as polyethylene terephthalate, polybutylene terephthalate, polyethylene naphthalate, polycyclohexylene dimethylene terephthalate, and polyethylene bisphenoxycarboxylate; polyolefins, such as polyethylene and polypropylene; cellulose derivatives, such as cellulose acetate butyrate and cellulose acetate propionate; vinyl resins, such as polyvinyl chloride and polyvinylidene chloride; polyamides; polyimides; polycarbonates; polysulfones; polyether ether ketones; polyurethanes, and the like. These polymers may be used either individually or as a combination of two or more thereof.

The magnetic layer 4 is a top layer of the magnetic recording medium, i.e., a layer positioned on the surface of the magnetic recording medium.

The magnetic layer 4 contains, as a lubricant, (A) a fatty acid ester derived from a straight-chain or branched aliphatic alcohol having 3 to 7 carbon atoms and a straight-chain or branched fatty acid having 12 to 18 carbon atoms and (B) a fatty acid ester derived from a straight-chain or branched aliphatic alcohol having 8 to 14 carbon atoms and a straight-chain or branched fatty acid having 12 to 18 carbon atoms.

The magnetic recording medium according to the present invention exhibit excellent electromagnetic conversion characteristics and excellent durability and causes few dropouts owing to the two kinds of fatty acid esters (A) and (B) incorporated into the magnetic layer.

While the aliphatic alcohol from which the fatty acid ester (A) can be derived may be either straight or branched, straight ones bring about favorable results in durability and environmental resistance.

The aliphatic alcohol contains 3 to 7 carbon atoms, preferably 4 to 6 carbon atoms for the same reason as described above.

While the aliphatic alcohol from which the fatty acid ester (B) can be derived may be either straight or branched, straight ones bring about favorable results in durability and environmental resistance.

The aliphatic alcohol contains 8 to 14 carbon atoms, preferably 8 to 13 carbon atoms for the same reason as described above.

While the fatty acids providing the fatty acid esters (A) and (B) may be either straight or branched, straight-chain fatty acids bring about favorable results in durability and environmental resistance.

These fatty acids contain 12 to 18 carbon atoms. For the same reason as described above, those containing 14 to 18 are preferred.

The aliphatic alcohols and fatty acids providing the fatty acid esters (A) and (B) may be either saturated or unsaturated.

Specific examples of the fatty acid esters (A) are propyl myristate, isopropyl myristate, butyl myristate, sec-butyl myristate, t-butyl myristate, heptyl myristate, propyl palmitate, isopropyl palmitate, butyl palmitate, sec-butyl palmitate, t-butyl palmitate, propyl stearate, isopropyl stearate, butyl stearate, sec-butyl stearate, t-butyl stearate, amyl stearate, propyl oleate, allyl oleate, and butyl oleate. Preferred are butyl palmitate and butyl stearate, with butyl stearate being particularly preferred.

These fatty acid esters (A) may be used either individually or as a mixture of two or more thereof.

Specific examples of the fatty acid esters (B) are myristyl myristate, 2-ethylhexyl myristate, 2-ethylhexyl laurate, 2-ethylhexyl stearate, tridecyl stearate, stearyl stearate, 2-ethylhexyl palmitate, 2-ethylhexyl oleate, octyl oleate, and lauryl oleate. Preferred are 2-ethylhexyl laurate, 2-ethylhexyl myristate, 2-ethylhexyl palmitate, 2-ethylhexyl stearate, and 2-ethylhexyl oleate.

These fatty acid esters (B) may be used either individually or as a mixture of two or more thereof.

The magnetic layer can further contain a fatty acid having 6 to 22 carbon atoms, preferably 14 to 18 carbon atoms, as a lubricant for obtaining further improvement in electromagnetic conversion characteristics and durability. The fatty acid may be either straight or branched and either saturated or unsaturated. Straight-chain and saturated or unsaturated fatty acids are preferred.

Preferred specific examples of the fatty acids include straight-chain saturated fatty acids, such as caproic acid, caprylic acid, capric acid, lauric acid, myristic acid, palmitic acid, stearic acid, arachic acid, behenic acid, and lignoceric acid; straight-chain unsaturated fatty acids, such as myristoleic acid, palmitoleic acid, petroselinic acid, oleic acid, vaccenic acid, erucic acid, linoleic acid, linolenic acid, arachidonic acid, eicosapentaenoic acid, and clupanodonic acid; and branched fatty acids, such as 2,5-diketyl-2-heptadecenoic acid. From the standpoint of improvement in electromagnetic conversion characteristics and durability, lauric acid, myristic acid, palmitic acid, stearic acid, oleic acid, linoleic acid, and linolenic acid are preferred. Myristic acid is the most preferred. These fatty acids can be used either individually or as a mixture of two or more thereof.

The magnetic layer is formed by applying a magnetic coating composition containing the fatty acid esters (A) and (B) as a lubricant and preferably further containing the fatty acid.

A preferred magnetic coating composition used for the formation of the magnetic layer mainly comprises magnetic powder, a binder and a solvent.

The magnetic coating composition used for forming the magnetic layer preferably contains the fatty acid esters (A) and (B) and the fatty acid, a preferred optional component, in a total amount of from 1 to 10 parts by weight, more preferably 2 to 8 parts by weight, per 100 parts by weight of the magnetic powder. If the total content of the fatty acid esters (A) and (B) and the fatty acid exceeds 10 parts by weight, the resulting magnetic recording medium has insufficient electromagnetic conversion characteristics. If it is less than 1 part by weight, the resulting magnetic recording medium tends to have poor durability. Accordingly, the above-specified range is preferred.

In the magnetic coating composition used for the formation of the magnetic layer, a preferred ratio of the fatty acid esters (A) to (B), (A)/(B), is 5/1 to 1/5, more preferably 2/1 to 1/2, by weight; and the proportion of the fatty acid is preferably 0.5 to 8 parts by weight, still preferably 1 to 6 parts by weight, per 100 parts by weight of the total amount of the magnetic powder.

The magnetic powder to be used in the magnetic coating composition for the formation of the magnetic layer includes ferromagnetic metal powder mainly comprising iron or hexagonal ferrite powder.

The ferromagnetic metal powder preferably has a coercive force of 1500 to 2500 Oe, more preferably 1600 to 2400 Oe. The hexagonal ferrite powder preferably has a coercive force of 1500 to 2500 Oe, more preferably 1600 to 2400 Oe.

The saturation magnetization of the ferromagnetic metal powder preferably ranges from 100 to 180 emu/g, more preferably 110 to 160 emu/g. The saturation magnetization of the hexagonal ferrite powder preferably ranges from 30 to 70 emu/g, more preferably 45 to 70 emu/g.

Accordingly, the magnetic layer containing the ferromagnetic metal powder preferably has a coercive force of 1500 to 2500 Oe, particularly 1600 to 2400 Oe, and the magnetic layer containing the hexagonal ferrite powder preferably has a coercive force of 1500 to 2500 Oe. The magnetic layer containing the ferromagnetic metal powder preferably has a saturation flux density of 3000 to 4500 gauss, particularly 3200 to 4000 gauss, and the magnetic layer containing the hexagonal ferrite powder preferably has a saturation flux density of 1500 to 2500 gauss, particularly 1600 to 2500 gauss.

The ferromagnetic metal powder can be such that has a metal content of 70% by weight or more, at least 80% by weight of which is iron (Fe). Examples of such ferromagnetic metal powders are Fe-Co, Fe-Ni, Fe-Al, Fe-Ni-Al, Fe-Co-Ni, Fe-Ni-Al-Zn, and Fe-Al-Si. The ferromagnetic metal powders can have a needle-like (acicular) shape or a spindle-like shape and preferably have a spindle-like shape of a major axis length of 0.05 to 0.25 µm, more preferably 0.05 to 0.2 µm, an acicular ratio of 3 to 20, a particle diameter measured by X-ray method of 130 to 250 Å, and a specific surface area of 40 to 80 m²/g.

The hexagonal ferrite powder includes fine tabular barium ferrite and strontium ferrite, and magnetic powders obtained by displacing part of the Fe atoms of these ferrites with Ti, Co, Ni, Zn, V or the like. The hexagonal ferrite powders preferably have a tabular diameter of 0.02 to 0.09 µm, an aspect ratio of 2 to 7, and a specific surface area of 25 to 70 $m^2/g$.

If desired, the magnetic powder to be used in the magnetic coating composition forming the magnetic layer may contain rare earth elements or transition metal elements.

In order to improve dispersibility of the magnetic powder, the magnetic powder may be subjected to a surface treatment.

The surface treatment can be carried out in the same manner as described in *Characterization of Powder Surfaces*, Academic Press. For example, the surface of the magnetic particles can be coated with an inorganic oxide.

The surface treatment can also be carried out by using an organic substance, such as a silane coupling agent, a titanium coupling agent or an aluminum coupling agent.

The binder which can be used in the magnetic coating composition forming the magnetic layer includes thermoplastic resins, thermosetting resins, and reactive resins, either individually or as a mixture thereof.

Examples of suitable binders are vinyl chloride resins, polyester, polyurethane, nitrocellulose, and epoxy resins. In addition, the resins disclosed in Japanese Patent Laid-Open No. 57-162128, page 2, upper right column, line 16 to lower right column, line 19 are also employable. These binders can contain a polar group for improvement in dispersibility.

The solvent which can be used in the magnetic coating composition for formation of the magnetic layer includes ketones, esters, ethers, aromatic hydrocarbons, and chlorinated hydrocarbons. Specific examples of useful solvents are disclosed in Japanese Patent Laid-Open No. 57-162128, page 3, lower right column, line 17 page 4, to lower left column, line 10.

The binder is suitably used in an amount of from 5 to 100 parts by weight, preferably of from 5 to 70 parts by weight, per 100 parts by weight of the magnetic powder. The solvent is preferably used in an amount of 80 to 500 parts by weight, more preferably 100 to 350 parts by weight, per 100 parts by weight of the magnetic powder.

If desired, the magnetic coating composition used for the formation of the magnetic layer may contain additives generally used in magnetic recording media, such as dispersants, lubricants other than the inventive lubricant disclosed herein, abrasives, antistatics, rust inhibitors, antifungals, and hardeners.

The magnetic coating composition for the formation of the magnetic layer can be prepared by, for example, preliminarily mixing the magnetic powder, the binder, and a part of the solvent in a Naughter mixer, etc. to form a premixture, kneading the premixture in a continuous pressure kneader, etc., diluting the mixture with another part of the solvent, followed by dispersing by means of a sand mill, etc., adding to the dispersion fatty acid ester (A) and (B) and the optional fatty acid as a lubricant, filtering the mixture, and adding thereto a hardener, such as a polyisocyanate, and the remainder of the solvent.

Thus, in the magnetic recording media 1 and 11 according to the embodiments of the invention shown in FIGS. 1 and 2, respectively, the magnetic layer 4 is formed by coating the intermediate layer 3 or the nonmagnetic substrate 2 with a magnetic coating composition containing the fatty acid esters (A) and (B) and, if desired, the fatty acid. Accordingly, the magnetic layer 4 contains, as a lubricant, the fatty acid esters (A) and (B) and, if desired, the fatty acid.

The magnetic layer 4 preferably has a thickness of 0.1 to 0.3 µm, more preferably 0.15 to 0.25 µm.

In the embodiment shown in FIG. 1, it is desirable that the magnetic layer 4 be formed while the intermediate layer 3 is wet.

The following is to explain the intermediate layer 3 provided on the nonmagnetic substrate 2 in the preferred embodiment of the magnetic recording medium of the invention shown in FIG. 1. It is preferable for durability and reduction in dropout that the intermediate layer contains a fatty acid and a fatty acid ester as a lubricant. The intermediate layer may be either a layer having magnetism or a layer having no magnetism.

Where the intermediate layer 3 is a layer having magnetism, it is a magnetic layer containing magnetic powder and preferably a fatty acid and a fatty acid ester (hereinafter referred to as a magnetic intermediate layer). The magnetic intermediate layer is formed by applying onto the nonmagnetic substrate a magnetic coating composition which preferably contains a fatty acid and a fatty acid ester as a lubricant.

Where the intermediate layer 3 is a layer having no magnetism, it is a nonmagnetic layer containing nonmagnetic powder and preferably a fatty acid and a fatty acid ester (hereinafter referred to as a nonmagnetic intermediate layer), which is formed by applying to the nonmagnetic substrate a nonmagnetic coating composition which preferably contains a fatty acid and a fatty acid ester as a lubricant.

A preferred magnetic coating composition for forming the magnetic intermediate layer can be a coating composition mainly comprising magnetic powder, a binder, and a solvent and, in addition, a fatty acid and a fatty acid ester.

The fatty acid which can be preferably used as a lubricant in the magnetic intermediate layer includes those enumerated above which are preferably incorporated into the magnetic layer. For the improvement in electromagnetic conversion characteristics and durability, lauric acid, myristic acid, palmitic acid, stearic acid, oleic acid, linoleic acid, and linolenic acid are preferred. Myristic acid is the most preferred. These fatty acids can be used either individually or as a mixture of two or more thereof.

The fatty acid ester which can be preferably used in the magnetic intermediate layer includes the fatty acid esters (A) and (B) that are incorporated into the magnetic layer. The magnetic intermediate layer can contain either one or both of the fatty acid ester (A) and the fatty acid ester (B). For the improvement in electromagnetic conversion characteristics and durability, it is preferable for the magnetic intermediate layer to contain both the fatty acid esters (A) and (B).

The fatty acid esters (A) and (B) can be those described as the fatty acid esters (A) and (B) that can be incorporated into the magnetic layer. In particular, the aliphatic alcohol and the fatty acid from which the fatty acid ester (A) is derived are both straight-chain ones. The aliphatic alcohol providing the fatty acid ester (B) is preferably a branched one, while the fatty acid providing the fatty acid ester (B) is preferably a straight-chain one.

Preferred examples of the fatty acid ester (A) are butyl palmitate and butyl stearate, with butyl stearate being still preferred. Preferred examples of the fatty acid ester (B) include 2-ethylhexyl laurate, 2-ethylhexyl myristate, 2-ethylhexyl palmitate, 2-ethylhexyl stearate, and 2-ethylhexyl oleate.

The magnetic coating composition used for the formation of the magnetic intermediate layer contains the above-described fatty acid and fatty acid ester, preferably in a total amount of 1 to 10 parts, more preferably 2 to 4 parts, by weight per 100 parts by weight of magnetic powder. If the total amount of the fatty acid and fatty acid ester exceeds 10 parts by weight, the resulting magnetic recording medium has insufficient electromagnetic conversion characteristics. If it is less than 1 part by weight, the resulting magnetic recording medium tends to have poor durability. Accordingly, the above-specified range is preferred.

In the magnetic coating composition used for the formation of the magnetic intermediate layer, the amount of the fatty acid ester is preferably 10 to 400 parts by weight, more preferably 50 to 200 parts by weight, per 100 parts by weight of the fatty acid.

The magnetic powder to be used in the magnetic coating composition for the magnetic intermediate layer preferably includes a ferromagnetic powder. Either of soft magnetic powder and hard magnetic powder may be used suitably.

While the soft magnetic powder is not particularly limited in kind, magnetic materials used in low-current devices, such as a magnetic head and an electron circuit, are preferred. For example, the soft magnetic materials described in *Tikazumi Toshinobu, Kyojiseitai no Buturi* (2nd Vol.), "*Jiki-tokusei to Ohyo*", pp. 368–376, Shokabo (1984) can be used. Soft magnetic oxide powders may be mentioned as specific examples.

Spinel type ferrite powders are preferably used as soft magnetic oxide powder. The spinel type ferrite powders include $MnFe_2O_4$, $Fe_3O_4$, $CoFe_2O_4$, $NiFe_2O_4$, $MgFe_2O_4$, $Li_{0.5}Fe_{2.5}O_4$, Mn-Zn type ferrite, Ni-Zn type ferrite, Ni-Cu type ferrite, Cu-Zn type ferrite, Mg-Zn type ferrite, Li-Zn type ferrite, Zn type ferrite, and Mn type ferrite. These soft magnetic oxide materials may be used either individually or as a combination of two or more thereof.

Soft magnetic metal powder can also be used as soft magnetic powder. Useful soft magnetic metal powders include Fe-Si alloys, Fe-Al alloys (e.g., Alperm, Alfenol and Alfer), Permalloy (e.g., Ni-Fe binary alloys or multinary alloys formed by adding to said Ni-Fe binary system, Mo, Cu or Cr), Sendust (Fe-Si-Al alloy consisting of 9.6 wt % of Si, 5.4 wt % of Al, and the balance of Fe), and Fe-Co alloys. These powders may be used either individually or as a combination of two or more thereof.

The soft magnetic oxide powder usually has a coercive force of 0.1 to 150 Oe and a saturation magnetization of 30 to 90 emu/g. The soft magnetic metal powder usually has a coercive force of 0.02 to 100 Oe and a saturation magnetization of 50 to 500 emu/g.

While the shape of the soft magnetic powder is not particularly limited, it is preferably spherical, tabular or amorphous. The soft magnetic powder preferably has a particle size of 5 to 800 nm.

The hard magnetic powders include ferromagnetic metal powder and hexagonal ferrite powder.

The ferromagnetic metal powder includes those having a metal content of 70% by weight or more, at least 80% by weight of which is iron (Fe). Examples of such ferromagnetic metal powders are Fe-Co, Fe-Ni, Fe-Al, Fe-Ni-Al, Fe-Co-Ni, Fe-Ni-Al-Zn, and Fe-Al-Si.

The hard magnetic oxide powder also includes iron oxides (ferromagnetic iron oxide powder represented by $FeO_x$ ($4/3<x<3/2$)); the $FeO_x$ doped with a divalent metal, e.g., Cr, Mn, Co or Ni; Co-coated $FeO_x$ (the $FeO_x$ coated with Co); chromium dioxide; and chromium dioxide doped with a metal, e.g., Na, K, Fe or Mn, a semiconductor, e.g., P, or an oxide of the metal.

The hard magnetic powders preferably have a needle-like (acicular) shape or a spindle-like shape and preferably have a major axis length of 0.05 to 0.25 µm, more preferably 0.05 to 0.2 µm, an acicular ratio of 3 to 20, and a diameter measured by X-ray method of 130 to 250 Å.

The hexagonal ferrite powder includes fine tabular barium ferrite and strontium ferrite, and magnetic powders obtained by displacing part of the Fe atoms of these ferrites with Ti, Co, Ni, Zn, V or the like atom. The hexagonal ferrite powders preferably have a tabular diameter of 0.02 to 0.09 µm and an aspect ratio of 2 to 7.

If desired, the magnetic powder may contain rare earth elements or transition metal elements.

In order to improve dispersibility of the magnetic powder, the magnetic powder can be subjected to the same surface treatment as for the magnetic powder used in the magnetic layer.

The binder to be used in the magnetic coating composition forming the magnetic intermediate layer can be those usable in the magnetic coating composition for the formation of the magnetic layer.

The solvent to be used in the magnetic coating composition forming the magnetic intermediate layer can be those usable in the magnetic coating composition for the formation of the magnetic layer.

The amount of the binder to be used is preferably about 5 to 200 parts by weight, more preferably 5 to 100 parts by weight, per 100 parts by weight of the magnetic powder. The amount of the solvent to be used is preferably about 80 to 500 parts by weight, more preferably 100 to 350 parts by weight, per 100 parts by weight of the magnetic powder.

The nonmagnetic coating composition used for formation of the nonmagnetic intermediate layer can preferably be a coating composition mainly comprising nonmagnetic powder, a binder, and a solvent and, in addition, a fatty acid and a fatty acid ester.

The nonmagnetic powder which can be used in the nonmagnetic coating composition forming the nonmagnetic intermediate layer is not particularly limited. Suitable examples of the nonmagnetic powders are particles of carbon black, graphite, titanium oxide, barium sulfate, zinc sulfide, magnesium carbonate, calcium carbonate, zinc oxide, calcium oxide, magnesium oxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. In particular, carbon black, titanium oxide, barium sulfate, calcium carbonate, alumina, and nonmagnetic iron oxide are preferred. These nonmagnetic powders may be used either individually or as a mixture of two or more thereof.

The nonmagnetic particles may have any of a spherical shape, a tabular shape, an acicular shape, and an amorphous shape. Spherical, tabular, and amorphous nonmagnetic particles preferably have a diameter of 5 to 200 nm, and acicular particles preferably have a major axis length of 20 to 300 nm with an acicular ratio of 3 to 20.

The binder, solvent, fatty acid and fatty acid ester which can be used in the nonmagnetic coating composition for the nonmagnetic intermediate layer can be selected from those usable in the above-described magnetic coating composition. The amounts and compounding ratios of the binder, solvent, fatty acid and fatty acid ester are also the same as in the magnetic coating composition.

If desired, the magnetic coating composition used for the formation of the magnetic intermediate layer and the nonmagnetic coating composition used for the formation of the nonmagnetic intermediate layer may contain additives generally used in magnetic recording media, such as dispersants, abrasives, antistatics, rust inhibitors, antifungals, and hardeners. Further, other lubricants commonly used in magnetic recording media can also be added.

Thus, the intermediate layer 3 in the magnetic recording medium 1 according to the preferred embodiment of the invention shown in FIG. 1 is formed by coating a nonmagnetic substrate with a magnetic or nonmagnetic coating composition which preferably contains the fatty acid and fatty acid ester. Accordingly, the intermediate layer 3 preferably contains the fatty acid and fatty acid ester as a lubricant.

The intermediate layer 3 preferably has a thickness of 0.2 to 5 μm, more preferably 0.5 to 4 μm, most preferably 0.5 to 3.5 μm.

As described above, the magnetic recording medium of the invention contains, in its magnetic layer, a fatty acid ester (A) and a fatty acid ester (B). In the preferred embodiment of the invention shown in FIG. 1, there is provided an intermediate layer 3 between the magnetic layer 4 and the nonmagnetic substrate 5, in which the intermediate layer 3 preferably contains a fatty acid and a fatty acid ester as a lubricant.

In the preferred embodiment shown in FIG. 1, it is preferable that the fatty acid contained in the intermediate layer 3 and that contained in the magnetic layer 4 be the same and that the fatty acid ester contained in the intermediate layer 3 be the same as at least either one of the fatty acid esters (A) and (B) contained in the magnetic layer 4. In this case, the two coating compositions agree with each other in physical properties, making coating operation stable.

The backcoating layer 5 which can, if desired, be provided on the reverse side of the nonmagnetic substrate 1 of the magnetic recording medium can be formed by using any known backcoating composition with no particular limitation.

The magnetic recording medium according to the invention may further have other layers in addition to the above-mentioned nonmagnetic substrate 2, intermediate layer 3, magnetic layer 4, and backcoating layer 5. For example, a primer layer or an additional magnetic layer for recording servo signals to cope with hard systems using long wavelength signals may be provided between the nonmagnetic substrate 2 and the intermediate layer 3 or the backcoating layer 5.

The magnetic recording medium of the invention is suitable as magnetic tapes, such as a 8 mm video tape and a DAT tape. It is also applicable as other recording media, such as floppy discs.

A preferred method for producing the magnetic recording medium of the present invention is described below with particular reference to the embodiment in which the magnetic recording medium has an intermediate layer.

A magnetic or nonmagnetic coating composition for forming an intermediate layer and a magnetic coating composition for forming a magnetic layer are simultaneously applied to a nonmagnetic substrate by wet-on-wet coating to the above-mentioned respective dry thicknesses to form a coating layer providing an intermediate layer and a magnetic layer. That is, it is preferable to form the magnetic layer while the intermediate layer is wet.

The coating layer is then subjected to orientation in a magnetic field, dried, and calendered. A backcoating composition is then applied to the back side of the nonmagnetic substrate and dried to form a backcoating layer. If necessary, for example, in the production of a magnetic tape, the coated film is subjected to aging at 40° to 70° C. for 6 to 72 hours, followed by slitting to desired width.

The above-mentioned simultaneous coating technique is described in Japanese Patent Laid-Open No. 5-73883, column 42, line 31 to column 43, line 31. This is a technique in which a magnetic coating composition forming a magnetic layer is applied before a magnetic or nonmagnetic coating composition forming an intermediate layer dries. According to this technique, a smooth interface between the intermediate layer and the magnetic layer and also satisfactory surface properties for the magnetic layer are secured. There is provided, as a result, a magnetic recording medium which causes few dropouts and can cope with high-density recording, the coating layer (inclusive of the intermediate layer and the magnetic layer) of which has excellent durability.

The magnetic orientation treatment is performed before the magnetic or nonmagnetic coating composition forming the intermediate layer and the magnetic coating composition forming the magnetic layer dry.

The backcoating layer, which may be provided if desired, is a layer provided on the back side of the nonmagnetic substrate (on the side having no intermediate layer or magnetic layer). This layer can be formed by coating the nonmagnetic substrate with a backcoating composition generally known for the formation of a backcoating layer.

If desired, the resulting magnetic recording medium may be subjected to finishing, such as polishing and cleaning of the magnetic layer. Application of the magnetic or nonmagnetic coating composition for the formation of the intermediate layer and the magnetic coating composition can also be conducted by a generally known successive coating technique.

The present invention will now be illustrated in greater detail with reference to Examples and Comparative Examples, but it should be understood that the present invention is not construed as being limited thereto. Unless otherwise indicated, all the parts, percents, and ratios are given by weight.

EXAMPLE 1

A magnetic tape was prepared by using a nonmagnetic coating composition forming an intermediate layer, a magnetic coating composition forming a magnetic layer, and a backcoating composition, each having the following formulations, in accordance with the method described below.

The magnetic layer formed of the magnetic coating composition having the following formulation was found to have a coercive force of 1900 Oe and a saturation flux density of 3000 gauss, as measured according to the measurement method hereinafter described.

| Nonmagnetic Coating Composition For Intermediate Layer: | |
|---|---|
| α-Iron oxide | 100 parts |
| Alumina (average particle size: 0.1 μm) | 7 parts |
| Carbon black (average primary particle size: 0.01 μm) | 2 parts |

-continued

| | |
|---|---|
| MR110 (a trade name of a vinyl chloride copolymer produced by Nippon Zeon Co., Ltd.) | 11 parts |
| UR8300 (a trade name of a urethane resin produced by Toyobo Co., Ltd.) | 4 parts |
| Coronate L (a trade name of a polyisocyanate compound produced by Nippon Polyurethane Industry Co., Ltd.) | 4 parts |
| Mixed solvent of methyl ethyl ketone, toluene and cyclohexanone (1:1:1) | 300 parts |
| Magnetic Coating Composition for Magnetic layer: | |
| Acicular ferromagnetic metal powder mainly comprising iron (coercive force: 1800 Oe; saturation magnetization: 125 emu/g; average major axis length: 0.10 μm; specific surface area 60 m²/g) | 100 parts |
| Alumina (average particle size: 0.1 μm) | 12 parts |
| Carbon black (average primary particle size: 0.05 μm) | 1 part |
| MR100 (a trade name of a vinyl chloride copolymer produced by Nippon Zeon Co., Ltd.) | 11 parts |
| UR8300 (a trade name of a urethane resin produced by Toyobo Co., Ltd.) | 7 parts |
| Coronate L (a trade name of a polyisocyanate compound produced by Nippon Polyurethane Industry Co., Ltd.) | 4 parts |
| Mixed solvent of methyl ethyl ketone, toluene and cyclohexanone (1:1:1) | 300 parts |
| Backcoating Composition: | |
| Carbon black (average primary particle size: 0.028 μm) | 32 parts |
| Carbon black (average primary particle size: 0.062 μm) | 8 parts |
| Nipporan 2301 (a trade name of polyurethane produced by Nippon Polyurethane Industry Co., Ltd.) | 50 parts |
| Nitrocellulose (a product of Hercules Powder Co.; Hercules-Powder viscosity: ½ sec) | 20 parts |
| D-250N (a trade name of polyisocyanate, produced by Takeda Chemical Industries. Ltd.) | 4 parts |
| Copper phthalocyanine | 5 parts |
| Stearic acid | 1 part |
| Methyl ethyl ketone | 120 parts |
| Toluene | 120 parts |
| Cyclohexanone | 120 parts |

Preparation of Magnetic Recording Medium

The components of the nonmagnetic coating composition for an intermediate layer (exclusive of Coronate L) and the components of the magnetic coating composition for a magnetic layer (exclusive of Coronate L) were kneaded in a planetary mixer with a mixed solvent of methyl ethyl ketone, toluene, and cyclohexanone to a solids content of 80%. After diluting with the same solvent to a solids content of 40%, the mixture was dispersed in a vertical sand mill. The mixture was further diluted with the same solvent to a solids content of 35%, and 2 parts each of the lubricants (fatty acid esters and fatty acid) shown in Table 1 below was added thereto, followed by filtration through a filter having an absolute filtration precision of 1 μm. Coronate L was then added to each mixture to prepare a nonmagnetic coating composition for forming an intermediate layer and a magnetic coating composition for forming a magnetic layer.

The resulting nonmagnetic coating composition for forming an intermediate layer and a magnetic coating composition for forming a magnetic layer were applied to a 6 μm thick polyethylene terephthalate film to a dry thickness of 2 μm and 0.2 μm, respectively, to form a coating layer providing an intermediate layer and a magnetic layer. While the coating layer was wet, the coated film was passed through a solenoid type magnet of 5000 Oe to conduct magnetic field orientation, dried at 80° C., and wound up. The coated film was calendered at a surface temperature of 85° C. and a linear pressure of 350 kg/cm to form an intermediate layer and a magnetic layer. The opposite side of the nonmagnetic substrate was then coated with the backcoating composition to a dry thickness of 0.5 μm, dried at 90° C., and taken up. The resulting coated film was aged at 50° C. for 16 hours and slit into a ½ inch wide strip, and the resulting magnetic tape was put into ½ in. data backup equipment.

The resulting magnetic tape as a magnetic recording medium was evaluated in accordance with the standards described below. The results obtained are shown in Table 4 below.

Standards of Evaluation of Magnetic Recording Medium

1) Electromagnetic Conversion Characteristics

A single wave of 2.6 MHz was recorded on the magnetic tape on DLT2000 drive manufactured by Quantum Corporation, U.S.A., and the reproduction output (C) was measured. The results were expressed relatively taking the output of DLT4 tape (a product of Quantum Corporation, U.S.A.) as a standard (100%) and graded as follows.

A . . . The reproduction output is not less than 85% and less than 125% of that of DLT4 tape.

B . . . The reproduction output is not less than 70% and less than 85% of that of DLT4 tape.

C . . . The reproduction output is less than 70% of that of DLT4 tape.

2) Durability Test

Signals of 2.6 MHz were recorded on the magnetic tape using a DLT2000 drive manufactured by Quantum Corporation, U.S.A., and errors were detected under an ambient temperature and ambient humidity condition. The time required for the equipment to stop due to errors was measured and graded as follows.

A . . . Not less than 250 hours.

B . . . Not less than 100 hours and less than 250 hours.

C . . . Not less than 50 hours and less than 100 hours.

D . . . Less than 50 hours.

3) Measurement of Missing Pulse Errors (Dropouts)

The number of missing pulse errors was measured on DLT2000 drive manufactured by Quantum Corporation, U.S.A. and graded as follows.

A . . . Less than 50 errors/KFt.

B . . . Not less than 50 and less than 100 errors/KFt.

C . . . Not less than 100 and less than 200 errors/KFt.

D . . . Not less than 200 errors/KFt.

The measuring conditions were as follows.
Recording frequency: 2.6 MHz
Threshold: 25%

Measurement of Coercive Force and Saturation Flux of Magnetic Layer

Only the magnetic layer was stripped off the sample tape by using an adhesive tape and punched into a test piece of prescribed dimension. The coercive force and saturation magnetization of the test piece thus prepared were measured with a vibrating sample magnetometer with an applied magnetic field of 10 KOe.

EXAMPLES 2 AND 3

Magnetic tapes were prepared in the same manner as in Example 1, except for using the compounds shown in Table 1 as a lubricant. Each of the lubricants (fatty acid esters (A) and (B) and fatty acid) was used in an amount of 2 parts.

The resulting magnetic tapes were evaluated in the same manner as in Example 1. The results obtained are shown in Table 4 below.

EXAMPLE 4

A magnetic tape was prepared in the same manner as in Example 1, except for using the following ferromagnetic metal powder in the magnetic coating composition for forming the magnetic layer. Spindle-shaped ferromagnetic metal powder mainly comprising iron having:

Coercive force: 1900 Oe
Saturation magnetization: 130 emu/g
Average major axis length: 0.10 μm
Specific surface area: 60 m²/g The resulting magnetic tape was evaluated in the same manner as in Example 1. The results obtained are shown in Table 4 below.

EXAMPLES 5 AND 6

Magnetic tapes were prepared in the same manner as in Example 1, except for using the compounds shown in Table 1 as a lubricant. The lubricants were each used in an amount of 2 parts, except that the fatty acid esters (A) and (B) in the intermediate layer were each used in an amount of 1 part.

The resulting magnetic tapes were evaluated in the same manner as in Example 1. The results obtained are shown in Table 4 below.

EXAMPLE 7

A magnetic tape was prepared in the same manner as in Example 1, except for replacing 100 parts of α-iron oxide The resulting magnetic tape was evaluated in the same manner as in Example 1. The results obtained are shown in Table 4 below.

COMPARATIVE EXAMPLES 1 TO 14

Magnetic tapes were prepared in the same manner as in Example 1, except for using the compounds shown in Table 2 (Comparative Examples 1 to 8) or Table 3 (Comparative Examples 9 to 14) as a lubricant. All the lubricants were each used in an amount of 2 parts.

The resulting magnetic tapes were evaluated in the same manner as in Example 1. The results obtained are shown in Tables 5 (Comparative Examples 1 to 8) and 6 (Comparative Examples 9 to 14).

The abbreviations used in Tables 1 to 3 have the following meanings:

Fatty Acid
  MA: myristic acid
  PA: palmitic acid
Fatty Acid Ester (A)
  BS: butyl stearate
  BP: butyl palmitate
  BOL: butyl oleate
Fatty Acid Ester (B)
  EHS: 2-ethylhexyl stearate
  EHP: 2-ethylhexyl palmitate
  EHOL: 2-ethylhexyl oleate
  TDS: tridecyl stearate

TABLE 1

| | | Examples | | | | | | |
|---|---|---|---|---|---|---|---|---|
| | | 1 | 2 | 3 | 4 | 5 | 6 | 7 |
| Magnetic Layer | Fatty Acid Ester (A) | BS | BS | BS | BS | BP | BOL | BS |
| | Fatty Acid Ester (B) | EHS | EHS | EHS | EHS | EHP | EHOL | EHS |
| | Fatty Acid | MA | MA | MA | MA | MA | MA | MA |
| Intermediate Layer | Fatty Acid Ester (A) | BS | | | BS | NBP | NBOL | BS |
| | Fatty Acid Ester (B) | | TDS | TDS | | EHP | EHOL | |
| | Fatty Acid | MA | MA | PA | MA | MA | MA | MA |

TABLE 2

| | | Comparative Examples | | | | | | | |
|---|---|---|---|---|---|---|---|---|---|
| | | 1 | 2 | 3 | 4 | 5 | 6 | 7 | 8 |
| Magnetic Layer | Fatty Acid Ester (A) | BS | BS | | | | | BS | |
| | Fatty Acid Ester (B) | | | EHS | EHS | | EHS | | |
| | Fatty Acid | | | | | | | | MA |
| Intermediate Layer | Fatty Acid Ester (A) | | BS | | BS | BS | BS | BS | BS |
| | Fatty Acid | MA | | MA | | MA | MA | MA | MA | used in the nonmagnetic coating composition for the formation of the intermediate layer with 60 parts of α-iron oxide and 40 parts of the following ferromagnetic powder to prepare a magnetic coating composition. Ferromagnetic metal powder comprising hexagonal ferrite powder having:

Coercive force: 1800 Oe
Saturation magnetization: 58 emu/g
Average major axis length: 0.06 μm
Specific surface area: 36 m²/g

TABLE 3

| | | Comparative Examples | | | | | |
|---|---|---|---|---|---|---|---|
| | | 9 | 10 | 11 | 12 | 13 | 14 |
| Magnetic Layer | Fatty Acid Ester (A) | | | BS | BS | BS | |
| | Fatty Acid | EHS | EHS | | | | EHS |

TABLE 3-continued

|  |  | Comparative Examples | | | | | |
|---|---|---|---|---|---|---|---|
|  |  | 9 | 10 | 11 | 12 | 13 | 14 |
| Intermediate Layer | Ester (B) Fatty Acid | MA BS | MA | MA BS | MA | MA BS | MA BS |
|  | Fatty Acid Ester (A) Fatty Acid |  | MA |  | MA | MA | MA |

TABLE 4

|  | Examples | | | | | | |
|---|---|---|---|---|---|---|---|
|  | 1 | 2 | 3 | 4 | 5 | 6 | 7 |
| Electromagnetic Conversion Characteristics | A | A | A | A | A | A | A |
| Durability | A | B | B | B | B | B | B |
| Dropout | A | A | B | B | B | B | B |

TABLE 5

|  | Comparative Examples | | | | | | | |
|---|---|---|---|---|---|---|---|---|
|  | 1 | 2 | 3 | 4 | 5 | 6 | 7 | 8 |
| Electromagnetic Conversion Characteristics | B | B | B | B | B | B | B | B |
| Durability | D | D | D | D | D | D | D | D |
| Dropout | D | D | D | D | D | C | C | C |

TABLE 6

|  | Comparative Examples | | | | | |
|---|---|---|---|---|---|---|
|  | 9 | 10 | 11 | 12 | 13 | 14 |
| Electromagnetic Conversion Characteristics | B | B | B | B | B | B |
| Durability | D | D | D | D | C | C |
| Dropout | C | C | C | C | C | C |

As is apparent from the results in Tables 4 to 6, the magnetic tapes of the present invention (Examples 1 to 7), in which the magnetic layer contains fatty acid esters (A) and (B) as a lubricant, exhibit excellent electromagnetic conversion characteristics and excellent durability and cause few dropouts. To the contrary, the magnetic tapes of Comparative Examples 1 to 14, in which the magnetic layer does not contain both the fatty acid esters (A) and (B) or either, are inferior to those of Examples 1 to 7 in terms of electromagnetic conversion characteristics and durability and cause dropouts frequently.

The disclosure in Japanese priority patent applications No. 7-304851, filed Nov. 22, 1995, and No. 8-254534, filed Sep. 26, 1996, is hereby incorporated by reference.

What is claimed is:

1. A magnetic recording medium comprising a non-magnetic substrate and a magnetic layer, said magnetic layer containing, as a lubricant, (A) a fatty acid ester of a straight-chain or branched aliphatic alcohol having 3 to 7 carbon atoms and a straight-chain or branched fatty acid having 12 to 18 carbon atoms, (B) a fatty acid ester of a straight-chain or branched aliphatic alcohol having 8 to 14 carbon atoms and a straight-chain or branched fatty acid having 12 to 18 carbon atoms, and (C) a saturated or unsaturated fatty acid having 6 to 22 carbon atoms, said magnetic recording medium having an intermediate layer provided between said non-magnetic substrate and said magnetic layer, said intermediate layer containing, as a lubricant, at least one fatty acid ester selected from the group consisting of said fatty acid ester (A) and said fatty acid ester (B), said intermediate layer also containing (C) a saturated or unsaturated fatty acid having 6 to 22 carbon atoms, at least one of either said fatty acid ester (A) or said fatty acid ester (B) being the same fatty acid ester as contained in said magnetic layer, said magnetic layer having a thickness of 0.1 to 0.3 μm and further containing an acicular ferromagnetic powder having a major axis length of 0.05 to 0.2 μm and an acicular ratio of 3 to 20, said intermediate layer having a thickness of 0.5 to 3.5 μm.

2. A magnetic recording medium according to claim 1, wherein said fatty acid ester (A) is an ester of a straight-chain aliphatic alcohol and a straight-chain fatty acid and said fatty acid ester (B) is an ester of a branched aliphatic alcohol and a straight-chain fatty acid.

3. A magnetic recording medium according to claim 2, wherein said fatty acid ester (A) is at least one ester selected from the group consisting of butyl palmitate and butyl stearate and said fatty acid ester (B) is at least one ester selected from the group consisting of 2-ethylhexyl laurate, 2-ethylhexyl myristate, 2-ethylhexyl palmitate, 2-ethylhexyl stearate, and 2-ethylhexyl oleate.

4. A magnetic recording medium according to claim 1, wherein a ratio of the fatty acid ester (A) to (B) is 5/1 to 1/5 by weight.

5. A magnetic recording medium according to claim 1, wherein said magnetic layer contains fatty acid (C) and said intermediate layer contains the same fatty acid (C) as that contained in said magnetic layer.

6. A magnetic recording medium according to claim 5, wherein said fatty acid (C) is myristic acid.

7. A magnetic recording medium according to claim 1, wherein the magnetic layer has a coercive force of 1500 to 2500 Oe.

8. A magnetic recording medium according to claim 1, wherein said magnetic layer is a layer formed while said intermediate layer is wet.

9. The magnetic recording medium according to claim 1, wherein said intermediate layer is magnetic and contains a hexagonal barium ferrite powder.

10. The magnetic recording medium according to claim 9, wherein both said magnetic layer and said intermediate layer contain the same fatty acid.

11. The magnetic recording medium according to claim 1, wherein said intermediate layer is non-magnetic, and both said magnetic layer and said intermediate layer contain the same fatty acid.

* * * * *